(12) United States Patent
Ravet

(10) Patent No.: US 9,032,810 B2
(45) Date of Patent: May 19, 2015

(54) METHOD AND ASSEMBLY FOR SENSING PERMANENT DEFORMATION OF A STRUCTURE

(75) Inventor: Fabien Ravet, Pully (CH)

(73) Assignee: OMNISENS SA, Morges (CH)

( * ) Notice: Subject to any disclaimer, the term of this patent is extended or adjusted under 35 U.S.C. 154(b) by 0 days.

(21) Appl. No.: 14/008,659

(22) PCT Filed: Apr. 7, 2011

(86) PCT No.: PCT/EP2011/055417
§ 371 (c)(1),
(2), (4) Date: Sep. 30, 2013

(87) PCT Pub. No.: WO2012/136259
PCT Pub. Date: Oct. 11, 2012

(65) Prior Publication Data
US 2014/0033825 A1    Feb. 6, 2014

(51) Int. Cl.
*G01L 1/24*    (2006.01)
*G01B 11/16*   (2006.01)
*G01M 5/00*    (2006.01)
*G01M 11/08*   (2006.01)

(52) U.S. Cl.
CPC .............. *G01B 11/16* (2013.01); *G01B 11/18* (2013.01); *G01L 1/242* (2013.01); *G01M 5/0025* (2013.01); *G01M 5/0041* (2013.01); *G01M 5/0091* (2013.01); *G01M 11/086* (2013.01)

(58) Field of Classification Search
CPC ............. G01L 1/24; G02B 6/00; G01B 11/16
USPC .............................................. 73/800; 385/13
See application file for complete search history.

(56) References Cited

U.S. PATENT DOCUMENTS 4,936,649 A * 6/1990 Lymer et al. .................... 385/13
5,182,449 A * 1/1993 Johnson et al. .......... 250/227.14
5,245,180 A    9/1993 Sirkis
(Continued)

FOREIGN PATENT DOCUMENTS

JP      2005-345376 A    12/2005
WO   2007/104915 A1     9/2007
WO   2010/028387 A2     3/2010

OTHER PUBLICATIONS

International Search Report for PCT/EP2011/055417 dated Nov. 21, 2011.
(Continued)

*Primary Examiner* — Lisa Caputo
*Assistant Examiner* — Octavia D. Hollington
(74) *Attorney, Agent, or Firm* — Pearne & Gordon LLP

(57) ABSTRACT

The present invention relates to a method of sensing permanent deformation of a structure, the method comprising the steps of; determining the strain required to permanently deform a structure; securing to the structure one or more strain sensors so that a strain sensor will deform when the structure is deformed, wherein the or each strain sensor comprises one or more optical fibers and wherein the or each strain sensor is configured such that it will permanently deform only when the structure permanently deforms; carrying out distributed fiber optic analysis to sense if a strain sensor has been permanently deformed, wherein a permanent deformation of a strain sensor indicates permanent deformation of the structure. The present invention also relates to a corresponding assembly.

14 Claims, 3 Drawing Sheets

(56) References Cited

U.S. PATENT DOCUMENTS

| | | | | |
|---|---|---|---|---|
| 5,609,952 | A | * | 3/1997 | Weiss .......................... 428/298.1 |
| 5,814,729 | A | * | 9/1998 | Wu et al. ......................... 73/588 |
| 7,284,903 | B2 | * | 10/2007 | Hartog .......................... 374/130 |
| 8,493,555 | B2 | * | 7/2013 | Li et al. ....................... 356/73.1 |
| 8,547,539 | B2 | * | 10/2013 | Ramos et al. ................ 356/73.1 |

OTHER PUBLICATIONS

Written Opinion for PCT/EP2011/055417 dated Nov. 21, 2011.

* cited by examiner

METHOD AND ASSEMBLY FOR SENSING PERMANENT DEFORMATION OF A STRUCTURE

FIELD OF THE INVENTION

The present invention concerns a method of sensing permanent deformation of a structure; and in particular, but not exclusively relates to a method of sensing permanent deformation of a structure which involves the use of distributed fiber optic analysis. The present invention also relates to a corresponding assembly.

DESCRIPTION OF RELATED ART

Structures such as pipes, hoses and umbilicals, are often subjected to heavy and careless handling; in particular careless handling of such structures can take place during manufacturing, transport, and installation of these structures. Careless handling of structures leads to structural deformation, structural fatigue and permanent deformation anywhere along the length of the structure. Structural deformation, structural fatigue or permanent deformation of a structure may not immediately be lethal but could provoke failure of the structure during its operation. At present there exists no means to detect and localize permanent deformation without destructing the entire structure.

At present there exists three means to evaluate structural deformation, structural fatigue and structural degradation of structures.

A first and obvious means is visual inspection of the structure. Although it has the advantage of simplicity, the means is limited as it only allows the assessment of superficial faults in a structure. Internal degradation will never be visible unless the structure is drastically deformed and consequently potentially lethal faults will go undetected. Such undetected faults will threaten future operation of the structure.

A second means consists of a post-mortem analysis of a structure. This involves applying strain to the structure until the structure fails and subsequently carrying out forensic analysis of the failed structure to establish where the structure was degraded, deformed or fatigued. Disadvantageously, this particular means is completely destructive and the structure therefore cannot be reused. Also, it is not possible to localize degradation, deformation or fatigue accurately using this means. Additionally, as the whole structure must be subjected to forensic analysis, this particular means for evaluating structural deformation, structural fatigue or permanent deformation, is very time consuming and expensive.

Finally, the structural fatigue and degradation of a structure can be monitored dynamically as the structure is in use. This means requires a fast acquisition interrogator which is capable of detecting stresses and strains in the structure during operation. Such an approach gives the real-time 'health status' of the structure, but is very costly due to the requirement for a fast acquisition interrogator. Furthermore, known interrogators which are configured to dynamically monitor a structure are not capable of detecting permanent deformation of the structure.

It is an aim of the present invention to mitigate at least some of the above-mentioned disadvantages.

BRIEF SUMMARY OF THE INVENTION

According to the invention there is provided a method of sensing permanent deformation of a structure, the method comprising the steps of; determining the strain required to permanently deform a structure; securing to the structure one or more strain sensors so that a strain sensor will deform when the structure is deformed, wherein the or each strain sensor comprises one or more optical fibers and wherein the or each strain sensor is configured such that it will permanently deform only when the structure permanently deforms; carrying out distributed fiber optic analysis to sense if a strain sensor has been permanently deformed, wherein a permanent deformation of a strain sensor indicates permanent deformation of the structure.

The or each strain sensor is configured such that the strain required to permanently deform the strain sensor is substantially equal to the strain required to permanently deform the structure. The or each strain sensor is configured such that the strain required to permanently deform the strain sensor is equal to the strain required to permanently deform the structure.

The method of the present invention uses fiber optic strain sensors and distributed fiber optic analysis to detect permanent deformation of a structure. The fiber optic sensor is secured to the structure to be monitored and is designed to have similar mechanical response to stresses and strains as the whole or part of the structure; this will ensure that the fiber optic sensor will undergo permanent deformation only when the structure is permanently deformed. When the structure is permanently deformed the fiber optic sensor will also become permanently deformed; once it has been permanently deformed, the optical characteristics of the fiber optical sensor will be changed permanently, thus effectively recording the occurrence of a permanent deformation of the structure. Accordingly, even if attempts are made to return a structure to its original shape after it has been permanently deformed, the optical strain sensor will still enable detection of the permanent deformation as the change in the optical characteristic of the fiber optical sensor will indicate that permanent deformation of the structure has occurred. Using suitable distributed fiber optic analysis the locality of the permanent deformation can be determined.

The fiber optical sensor may comprise one or more layers which surround an optical fiber. The one or more layers may be polymer layers. When the structure to which a strain sensor is secured, undergoes permanent deformation, the one or more layers of the strain sensor may deform so that fiber optical sensor records the occurrence of permanent deformation of the structure. For example, the one or more layers may be a plurality of laminated layers; when the structure to which the optical sensor is attached undergoes permanent deformation, the laminated layers may be caused to deform so that they become permanently separated from one another, at least along part of the optical sensor. In this way the occurrence of permanent deformation of the structure is recorded. The permanent separation of the laminated layers records the stress applied to the optical fiber of the strain sensor; this stress is used to identify the occurrence of permanent deformation of the structure; using suitable distributed fiber optic analysis the stress caused in the optical fiber by the separated layers can be detected. Since the separation of the laminated layers is permanent, the permanent deformation of the structure is permanently recorded, thereby permitting the detection of the permanent deformation of the structure at any stage. In addition, even if attempts are made to return the structure to its original shape after it has been permanently deformed, due to the permanent separation of the laminated layers, strain on the optical fibre of the strain sensor is not relieved. Thus, the occurrence of permanent deformation of the structure can be detected even if attempts are made to return the structure to its original shape after it has been permanently deformed._

The distributed fiber optic analysis may comprise Brillouin scattering analysis.

The distributed fiber optic analysis may comprise coherent Rayleigh scattering.

Preferably, Brillouin and coherent Rayleigh scattering are used to measure strain. If using regular OTDR technique, the strain or deformation is preferably converted into loss.

The Brillouin scattering analysis may comprise spontaneous Brillouin scattering analysis which relies on the detection and the analysis of the backscattering due to a modulated pump signal.

The Brillouin scattering analysis may comprise stimulated Brillouin scattering analysis which relies on the detection and the analysis of a backscattered lightwave which is the product of the interaction of a pump signal and a probe signals.

The method may further comprise the step of providing a protective means which is configured to protect the or each strain sensor from damage. This will extend the working life of the or each strain sensor when required to operate in harsh environments. For example, providing a strain sensor with a steel tube will prevent any hydrogen or chemical ingress to the strain sensor which could affect long term operation of the strain sensor.

The method may further comprise the step of pre-straining a strain sensor before securing it to the structure. The step of pre-straining a strain sensor may comprise the step of pre-straining a strain sensor in tensile or compression.

The step of securing to the structure one or more strain sensors may comprise one or more of the following steps; embedding a strain sensor within the structure; clamping a strain sensor to the structure; gluing a strain sensor to the structure; fastening a strain sensor to the structure using fasteners; taping a strain sensor to the structure; providing a cover on the structure and providing a stain sensor between the cover and a surface of the structure so that the strain sensor is held against a surface of the structure. It will be understood that any suitable means for securing the or each strain sensor to the structure can be used, provided that the securing means will secure the or each strain sensor to the structure in a manner which ensures that the or each strain sensor will permanently deform when the structure permanently deforms.

According to a further aspect of the present invention there is provided an assembly comprising; a structure which is to be monitored for permanent deformation; one or more strain sensors secured to the structure such that the strain sensors will deform when the structure deforms, wherein the or each strain sensor comprises one or more optical fibers, and wherein the or each strain sensor is configured such that it will permanently deform only when the structure is permanently deformed.

The or each strain sensor is configured such that the strain required to permanently deform the strain sensor is equal to the strain required to permanently deform the structure. The or each strain sensor is configured such that the strain required to permanently deform the strain sensor is substantially equal to the strain required to permanently deform the structure.

A strain sensor may comprise one or more layers. The one or more layers may be polymer layers. The one or more layers may be laminated layers. The laminated layer may be configured to deform, at least along part of a length of the strain sensor, when the structure to which the strain sensor is secured undergoes permanent deformation. This enables the occurrence of permanent deformation of the structure to be recorded. The deformation of the laminated layers may be separation of the laminated layers i.e. permanent separation of the laminated layers. The laminated layers may be configured such that when they deform they will cause strain in an optical fiber of a strain sensor. For example, the laminated layers may be configured such that when they separate they will cause strain in an optical fiber of a strain sensor. This strain caused in an optical fiber may be detectable by suitable distributed fiber optic analysis; thus allowing the occurrence of permanent deformation of the structure to be identified. Additionally, as the laminated layers permanently separate from one another, and in doing so impart a strain on the optical fiber which is detectable, even if attempts are made to return the structure to it original shape after permanent deformation, the occurrence of permanent deformation of the structure will still be detectable. The laminated layers will remain separated from one another even if the structure is returned to its original shape. As the laminated layers will remain separated from one another, they will still cause strain in an optical fiber of a strain sensor even if the structure is returned to its original shape; thus the occurrence of permanent deformation of the structure is still detectable even if the structure is returned to its original shape after permanent deformation.

The assembly may further comprise a protective means configured to protect a strain sensor from damage and/or to prolong the working life of the strain sensor.

The protective means may be a metal tube.

The or each strain sensor may further comprise reinforcing wires. This will make the or each strain sensor less prone to crushing.

The one or more optical fibers may comprise a single mode optical fiber.

The single mode optical fiber may be a fiber selected from one or more of the following International Telecommunication Union families: G.652, G.653, G.654, G.655 and G.657.

The assembly may further comprise one or more polymer layers. The one or more laminated layers may be polymer layers.

The assembly may further comprise an interrogator unit configurable to perform distributed fiber optic analysis to sense if a strain sensor has been permanently deformed.

The distributed fiber optic analysis may comprise Brillouin scattering analysis. The distributed fiber optic analysis may comprise coherent Rayleigh scattering analysis.

The Brillouin scattering analysis may comprise spontaneous Brillouin scattering analysis which relies on the detection and the analysis of the backscattering of a modulated pump signal. In the case spontaneous scattering analysis, depending on the type of modulation, the interrogator may comprise, a Brillouin Optical Time Domain Reflectometer (BOTDR), an Optical Frequency Domain Reflectometer (BOFDR), and/or a Brillouin Optical Coherency Domain Reflectometer (BOTDR).

The Brillouin scattering analysis may comprise stimulated Brillouin scattering analysis which relies on the detection and the analysis of a backscattered lightwave which is the product of the interaction of a pump signal and a probe signals. In the case of stimulated Brillouin scattering analysis, depending on the type of modulation, the interrogator may comprise, a Brillouin Optical Time Domain Analyzer (BOTDA), an Optical Frequency Domain Analyzer (BOFDA), and/or a Brillouin Optical Coherency Domain Analyzer (BOTDA).

Distributed information may be obtained by applying time, phase or frequency domain modulations of the measuring signals emitted by an interrogator. The distributed mode of operation can also be achieved by combining two or three of the modulation schemes.

The structure may be a flexible structure. The structure may be a tubular component. For example, the structure may be a pipe, umbilical, and/or hose.

BRIEF DESCRIPTION OF THE DRAWINGS

The invention will now be described, by way of example only, with reference to the following figures in which.

DETAILED DESCRIPTION OF POSSIBLE EMBODIMENTS OF THE INVENTION

Figure 1:
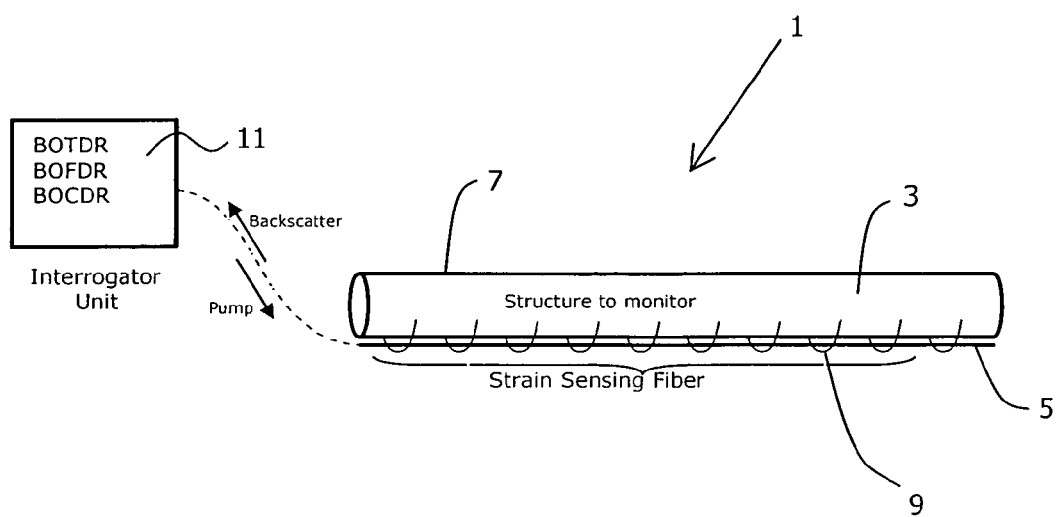
FIG. 1 provides a side view of an assembly according to a first embodiment of the present invention.

FIG. 1 provides a side view of an assembly 1 according to a first embodiment of the present invention.

The assembly comprises a structure 3 which is to be monitored for permanent deformation. Secured to the structure 3 is a strain sensor 5 which is configured such that the strain required to permanently deform the strain sensor 5 is similar to the strain which is required to permanently deform the structure 3. The strain sensor 5 comprises an optical fiber (not shown). Any number of strain sensors 5 may be provided.

It should be noted that before the assembly 1 is constructed the strain required to permanently deform the structure 3 is first determined. This may be determined by, for example, obtaining a test structure which has the same properties as the structure which is to be monitored for permanent deformation, and then applying a measured stress to the test structure until it becomes permanently deformed; and recording the stress at which the test structure becomes permanently deformed. Once the stress required for permanent deformation of the structure has been determined, it can be assumed that similar structures will require a similar stress for permanent deformation. Alternatively, mechanical modelling of the structure can be used to estimate the strain level resulting in permanent deformation; this result is then used to design the sensor. Similar tests are carried out on strain sensors to establish the stress required to permanently deform a particular strain sensor. The mechanical properties of a strain sensor may be modified by incorporating for example, reinforcement wires, metal layers, and/or polymer layers into the stain sensor; thus the strain sensor can be modified to permanently deform at a predetermined strain. Knowing the stress required for permanent deformation of a structure, and the stress required to deform a particular strain sensor, it is now possible to match a suitable strain sensor with a structure, so that strain sensor requires the same strain to permanently deform as the strain required to permanently deform the structure.

The strain sensor 5 is secured to the structure 3 in a manner which will ensure that the stain sensor 5 will permanently deform when the structure 3 permanently deforms. In the particular example shown in FIG. 1, the strain sensor 5 is clamped to an outer-surface 7 of the structure 3 by means of clamping means 9, however it will be understood that any suitable means for securing the strain sensor 5 to the structure 3 may be used. It should be noted that in certain cases the strain sensor 5 is pre-strained, either in compression or tensile, before it is secured to the structure 3. Moreover, it will be understood that more than one sensor can be secured to the structure.

An interrogator unit, in the form of a Brillouin Optical Time Domain Reflectometer 11 is provided in optical communication with the strain sensor 5. It will be understood that the interrogator unit make take other suitable forms, for example, it may be an Optical Frequency Domain Reflectometer (BOFDR) or a Brillouin Optical Coherency Domain Reflectometer (BOFDR).

During use, as long as the structure 3 is handled with sufficient care to ensure that no permanent deformation of the structure 3 occurs, the strain sensor 5 must respond linearly and without hysteresis to any deformation of the structure 3. However, if the structure is handled carelessly such that the structure 3 is permanently deformed, then the strain sensor 5 will also become permanently deformed; once it has been permanently deformed, the optical characteristics of the optical fiber within the strain sensor 5 will be changed permanently; thus effectively recording the occurrence of a permanent deformation of the structure 3. Accordingly, even if attempts are made to return a structure 3 to its original shape after it has been permanently deformed, the strain sensor 5 will still enable detection of the permanent deformation has taken place as the change in the optical characteristic of the optical fiber within the strain sensor 5 will indicate that permanent deformation of the structure 3 has occurred. This is achieved by the fact that the sensor may comprise one or more laminated layers for example, which, when the strain sensor 5 is forced to undergo permanent deformation will permanently deform e.g. become permanently separated from each other. This permanent deformation of the laminated layers will lock (freeze) the strain applied to an optical fiber of the strain sensor 5 which can be detected using suitable distributed fiber optic analysis; detection of the strain indicates the occurrence of permanent deformation of the structure 3. The laminated layers will preferably permanently deform e.g. become permanently separated from one another; thus the occurrence of permanent deformation of the structure 3 will be recorded and can therefore be detected at any time. Using suitable distributed fiber optic analysis the locality of the permanent deformation in the structure 3 can be determined. As the laminated layers a permanently separated from one another, the occurrence of permanent deformation of the structure will be detectable even if attempts are made to return the structure to its original shape after it has been permanently deformed.

In the embodiment shown in FIG. 1 spontaneous Brillouin scattering is used to detect the occurrence of permanent deformation and also to determine the location along the structure 3 where the permanent deformation has occurred. In order to implement the spontaneous Brillouin scattering the Brillouin Optical Time Domain Reflectometer 11 generates an optical pump signal which is sent along the optical fiber of the strain sensor 5. Permanent deformations which have been caused in the strain sensor 5 due to permanent deformation of the structure 3, will cause at least some modification of the backscattered signal. The detection of backscattered light will therefore indicate that the strain sensor 5 has been permanently deformed; this in turn will indicate that the structure 3 to which the strain sensor 5 is secured has been permanently deformed. By analysing the backscattered light the precise location in the structure 3 where permanent deformation has occurred can be established. Thus, the occurrence of permanent deformation of the structure 3 and its precise location on the structure, can be established.

Figure 2:
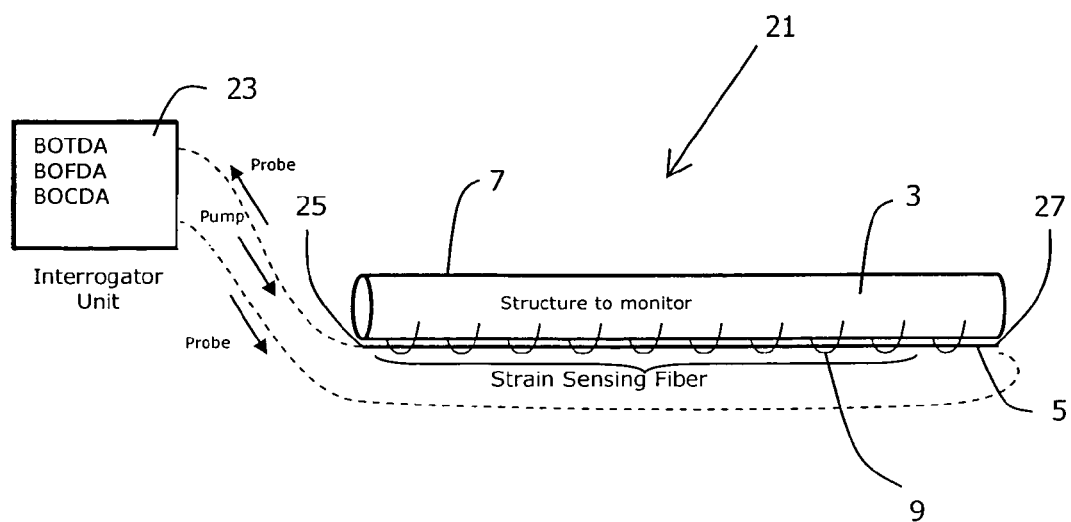
FIG. 2 provides a side view of an assembly according to a second embodiment of the present invention.

FIG. 2 provides a side view of an assembly 21 according to a second embodiment of the present invention. The embodiment shown in FIG. 2 has many of the same features as shown in FIG. 1 and like features are awarded the same reference numerals.

An interrogator unit, in the form of a Brillouin Optical Time Domain Analyzer 23 is provided in optical communication with the strain sensor 5. It will be understood that the interrogator unit may take any other suitable forms, for example, it may be an Optical Frequency Domain Analyzer (BOFDA), Brillouin Optical Coherency Domain Analyzer (BOFDA).

The assembly 21 shown in FIG. 2 is configured to detect permanent deformation of the structure 3 and also to determine the location along the structure 3 where the permanent deformation has occurred, using stimulated Brillouin scattering. In order to implement the stimulated Brillouin scattering the Brillouin Optical Time Domain Analyzer 23 generates a optical pump signal which it sends through a first end 25, in a first direction, along the optical fiber of the strain sensor 5. The Brillouin Optical Time Domain Analyzer 23 also generates a probe signal which it sends through a second, opposite, end 27, in a second direction, along the optical fiber of the strain sensor 5. Permanent deformations which have been formed in the strain sensor 5 due to permanent deformation of the structure 3 (e.g. separation of laminated layers which of the strain sensor 5 which freeze strain in an optical fiber of the stain sensor 5), will locally change the interaction of the pump signal and the probe signal within the optical fiber of the strain sensor 5. The analysis of the backscattered lightwave will therefore indicate that the strain sensor 5 has been permanently deformed; this in turn will indicate that the structure 3 to which the strain sensor 5 is secured has been permanently deformed. By further analysing the backscattered lightwave the precise location in the structure 3 where permanent deformation has occurred can be established. Thus, the occurrence of permanent deformation of the structure 3 and it precise location where such deformation has occurred, can be established.

It will be understood that the assemblies described above will also operate using other distributed fiber optic analysis; for example Coherent Rayleigh Scattering.

Figure 3A:
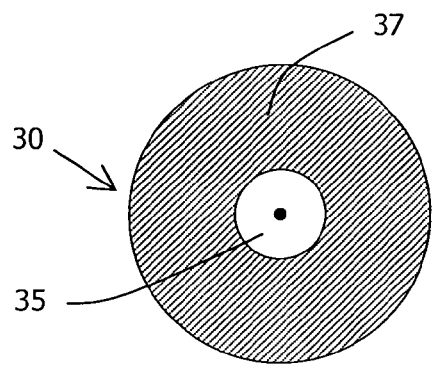
FIGS. 3a-3c provide a cross-sectional view of various embodiments of strain sensors which are suitable for use in the assemblies shown in FIGS. 1 and 2.
Figure 3B:
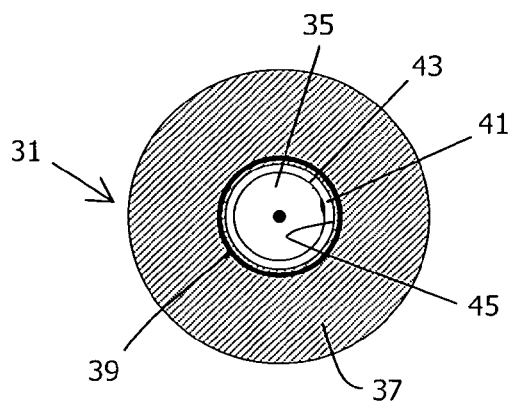
Figure 3C:
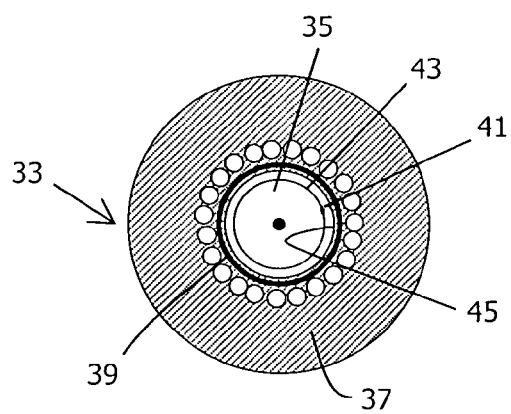

FIGS. 3a-3c provide a cross-sectional view of various strain sensor embodiments 30, 31, 33 which are suitable for use in the assemblies shown in FIGS. 1 and 2. It will be understood that other embodiments are also possible.

FIG. 3a illustrates a strain sensor 30 which comprises a single-mode optical fiber cable 35. The single-mode fiber 35 can be of any suitable type; preferably the single-mode fiber 35 is a fiber selected from one of the following families: ITU G.652, G.653, G.654, G.655 or G.657.

A polymer coat 37 is provided on the single-mode optical fiber cable 35. The polymer coat 37 may comprise a single-layer or multi-layers of polymer; in the multi-layer case some or each of the layers may comprise different polymers.

FIG. 3b illustrates a strain sensor 31; the strain sensor 31 has many of the same features as the strain sensor 30 shown in FIG. 3a and like features are awarded the same reference numerals.

The strain sensor 31 comprises a steel layer which is formed by a steel tubing 39 in which the single-mode optical fiber cable 35 is positioned. An intermediate polymer layer 41 is interposed between an outer surface 43 of the single-mode optical fiber cable 35 and an inner surface 45 of the steel tubing 39. The provision of an intermediate polymer layer 41 is optional. Advantageously, the steel tubing 39 will protect the single-mode optical fiber cable 35, and will therefore protect the strain sensor 31 from damage; thereby enabling the strain sensor 31 to be used in harsh environments and increasing the strain sensor's 31 working life. For example the steel tubing 39 will prevent hydrogen or chemical ingress that could affect long term operation of the strain sensor 31.

FIG. 3c illustrates a further strain sensor 33; the strain sensor 33 has many of the same features as the strain sensor 31 shown in FIG. 3b and like features are awarded the same reference numerals.

The strain sensor 31 comprises reinforcing wires 47. Among other advantages the reinforcing wires 47 will make the strain sensor 31 more resistant to crushing. The reinforcing wires 47 can be arranged to have any configuration; preferably, the reinforcing wires are arranged to lie parallel to the single-mode optical fiber cable 35.

The thickness and materials used to form the steel tubing 39, polymer layers 37,41 and reinforcement wires 47, described above in FIGS. 3a,3b,3c, can be used to modify the mechanical characteristics of the strain sensor 30,31,33 so that the strain at which the strain sensor 30,31,33 undergoes permanent deformation, matches the strain at which the structure 3 to be monitored undergoes permanent deformation.

To enable accurate operation of the strain sensor 30,31,33 to detect permanent deformation of a structure 3, the strain sensor 30,31,33 preferably should be secured to the structure 3 such that it will permanently deform when the structure 3 permanently deforms.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment

What is claimed is:

1. A method of sensing permanent deformation of a structure, the method comprising the steps of;
   determining the strain required to permanently deform a structure;
   securing to the structure one or more strain sensors so that a strain sensor will deform when the structure is deformed, wherein the or each strain sensor comprises one or more optical fibers and wherein the or each strain sensor is configured such that it will permanently deform only when the structure permanently deforms;
   carrying out distributed fiber optic analysis to sense if a strain sensor has been permanently deformed, wherein a permanent deformation of a strain sensor indicates permanent deformation of the structure, wherein the strain sensor comprises one or more laminated layers, and wherein permanent deformation of the strain sensor comprises the separation of at least some of the one of more laminated layers along at least part of a length of the strain sensor.

2. The method according to claim 1 wherein the or each strain sensor is configured such that the strain required to permanently deform the strain sensor is equal to the strain required to permanently deform the structure.

3. A method according to claim 1 wherein, the distributed fiber optic analysis comprises Brillouin scattering analysis.

4. A method according to claim 3 wherein the Brillouin scattering analysis comprises spontaneous Brillouin scattering analysis which relies on the detection and the analysis of the backscattering of a modulated pump signal.

5. A method according to claim 3 wherein the Brillouin scattering analysis comprises stimulated Brillouin scattering analysis which relies on the detection and the analysis of a backscattered lightwave which is the product of the interaction of a pump signal and a probe signals.

6. A method according to claim 1 further comprising the step of providing a protective means which is configured to protect the or each strain sensor from damage.

7. A method according to claim 1 further comprising the step of pre-straining a strain sensor before securing it to the structure.

8. A method according to claim 1 wherein the step of securing structure one or more strain sensors comprises one or more of the following steps; embedding a strain sensor within the structure; clamping a strain sensor to the structure; gluing a strain sensor to the structure; fastening a strain sensor to the structure using fasteners; taping a strain sensor to the structure; providing a cover on the structure and providing a stain sensor between the cover and a surface of the structure so that the strain sensor is held against a surface of the structure.

9. An assembly comprising;
a structure which is to be monitored for permanent deformation;
one or more strain sensors secured to the structure such that the strain sensors will deform when the structure deforms, wherein the or each strain sensor comprises one or more optical fibers, and wherein the or each strain sensor is configured such that it will permanently deform only when the structure is permanently deformed, wherein the strain sensor comprises one or more laminated layers, and wherein permanent deformation of the strain sensor comprises the separation of at least some of the one of more laminated layers along at least part of a length of the strain sensor.

10. The assembly according to claim 9 wherein the or each strain sensor is configured such that the strain required to permanently deform the strain sensor is equal to the strain required to permanently deform the structure.

11. An assembly according to claim 9 wherein a strain sensor comprises one or more laminated layers, wherein the laminated layers are configured to separate at least along part of a length of the strain sensor, when the structure to which the strain sensor is secured undergoes permanent deformation.

12. An assembly according to claim 9, wherein the one or more optical fibers comprises a single mode optical fiber.

13. An assembly according to claim 9 further comprising, an interrogator unit configurable to perform distributed fiber optic analysis to sense if a strain sensor has been permanently deformed.

14. An assembly according to claim 9, wherein the distributed fiber optic analysis comprises Brillouin scattering analysis.

* * * * *

UNITED STATES PATENT AND TRADEMARK OFFICE
CERTIFICATE OF CORRECTION

| | | |
|---|---|---|
| PATENT NO. | : 9,032,810 B2 | Page 1 of 1 |
| APPLICATION NO. | : 14/008659 | |
| DATED | : May 19, 2015 | |
| INVENTOR(S) | : Fabien Ravet | |

It is certified that error appears in the above-identified patent and that said Letters Patent is hereby corrected as shown below:

In the specification,

Column 4, line 50, replace "BOTDR" with -- BOCDR --

Column 4, line 59, replace "BOTDR" with -- BOCDA --

Column 6, line 3, replace "BOTDR" with -- BOCDR --

Column 7, line 3, replace "BOTDR" with -- BOCDA --

Signed and Sealed this
Fifth Day of January, 2016

Michelle K. Lee
*Director of the United States Patent and Trademark Office*